July 24, 1962
B. H. CONAWAY
3,045,452
ABSORBER ASSEMBLY
Filed Feb. 29, 1960
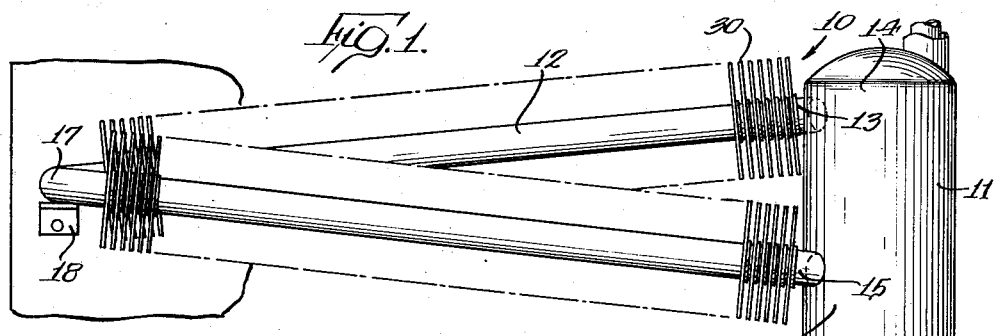
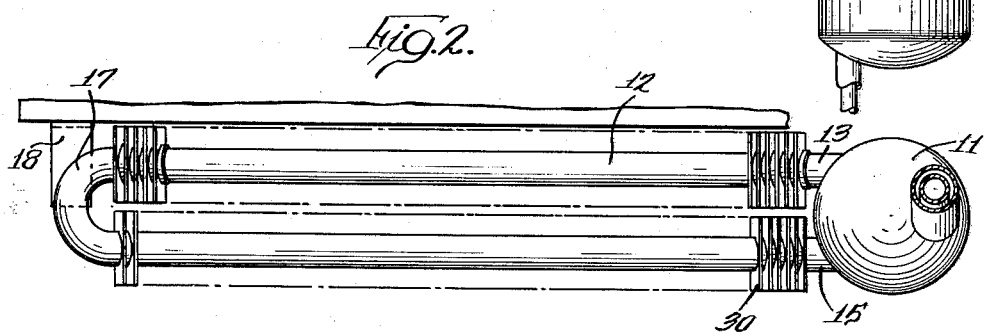
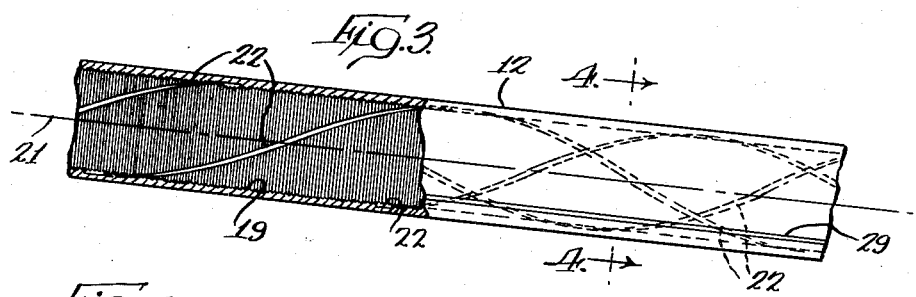
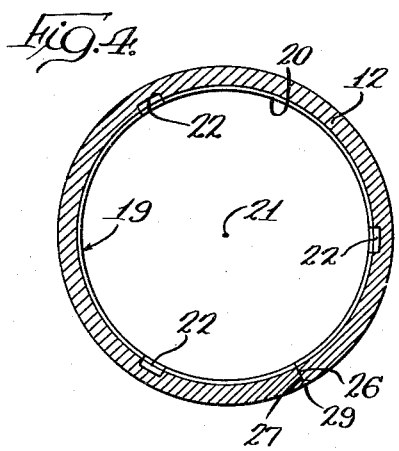
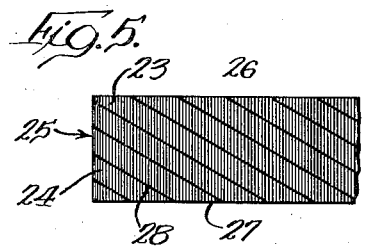
INVENTOR.
Bolyn H. Conaway
BY Hofgren, Brady,
Wegner, Allen & Stellman
Attys.

United States Patent Office 3,045,452
Patented July 24, 1962

3,045,452
ABSORBER ASSEMBLY
Bolyn H. Conaway, Evansville, Ind., assignor to Whirlpool Corporation, a corporation of Delaware
Filed Feb. 29, 1960, Ser. No. 11,828
4 Claims. (Cl. 62—491)

This invention relates to refrigeration systems and in particular to a conduit such as for use in an absorber assembly of an absorption refrigeration system.

In a uniform pressure type of absorption refrigeration system, a refrigerant such as ammonia forms a gaseous mixture with an inert gas in an evaporator portion of the system. The resultant mixture which is rich in the refrigerant gas and is, thusly, referred to as rich gas is delivered to an absorber assembly for contact with an absorption liquid such as water having only a small amount of ammonia dissolved therein and which is, thusly, referred to as a weak liquid. The intermingling of the rich gas with the weak liquid in the absorber assembly causes the water to take up ammonia from the rich gas whereupon the liquid becomes rich liquid. A more complete discussion of such an absorption refrigeration system and absorber assembly is presented in copending Benamin A. Phillips application Serial No. 828,584, filed July 21, 1959 and assigned to the assignee of this application. The present invention is concerned more specifically with an absorber tube construction for use in such an absorber assembly.

To effect maximized efficiency in the transfer of the ammonia from the rich gas to the liquid in the absorber assembly, it is desirable that an effectively maximized liquid surface be presented to the rich gas and the flow of the rich gas against this surface be somewhat turbulent. As illustrated in the above-identified Phillips application and in Phillips Patent 2,691,281, it has heretofore been proposed that such an absorber conduit be provided with a plurality of internal helical grooves and an inserted helicoid. One of the features of the present invention is to provide a new and improved conduit construction of simplified manufacture, reduced cost and improved efficiency of operation.

Another feature of the invention is the provision of such a conduit comprising a tube having an inner wall surface provided with a first, capillary groove extending substantially transversely to the axis of the tube, and a second, helical groove concentric of the tube axis and intersecting the capillary groove, the second groove having a cross section substantially larger than that of the capillary groove.

A further feature of the invention is the provision of such a conduit wherein the grooves are made up of portions terminating on a line defined by the intersection of the tube inner wall surface with a plane in which the tube axis lies.

A further feature of the invention is to provide a new and improved method of making a conduit of the character described including the steps of forming in one surface of an elongated sheet a plurality of transverse capillary grooves, forming in the surface a groove having a cross section substantially larger than the cross section of the capillary grooves and extending substantially from side to side of the sheet and intersecting at a substantial angle the capillary grooves, and forming the sheet into a tube at an axis parallel to the direction of elongation of the sheet, with the sides abutting, and the surface in which the grooves are formed defining the inner surface of the tube.

Still another feature of the invention is the provision of such a method of making a conduit wherein the ends of the transverse capillary grooves at one side of the sheet are indiscriminately positioned relative to the opposite ends thereof at the opposite side of the sheeet when the sheet sides are abutted.

Other features and advantages of the invention will be apparent from the following description taken in connection with the accompanying drawing wherein:

FIG. 1 is a side elevation of an absorber assembly provided with a conduit embodying the invention;
FIG. 2 is a plan thereof partially broken away;
FIG. 3 is a longitudinal, diametric section of a portion of the absorber tube;
FIG. 4 is a transverse section thereof taken substantially along the line 4—4 of FIG. 3; and
FIG. 5 is a plan of a sheet from which the tube may be made, illustrating the arrangement of the grooves in one surface thereof prior to the forming of the sheet into the tubular arrangement.

In the exemplary embodiment of the invention as disclosed in the drawing, an absorber assembly generally designated 10 comprises a container 11 and a conduit 12 having one end 13 connected to the container 11 at an upper portion 14 thereof and a lower end 15 connected to the container at a lower portion 16 thereof. As best seen in FIGS. 1 and 2, the conduit 12 is arranged in a hairpinlike configuration having its turned end 17 supported on a suitable bracket 18.

Referring now more specifically to FIGS. 3 and 4, the conduit 12 comprises a tube having an inner wall surface 19 provided with at least one capillary groove 20 extending substantially transversely to the axis 21 of the tube. Grooves 20 are preferably relatively shallow, fine grooves and may have a cross section generally similar to that of the evaporator tube grooves illustrated in W. L. O'Brien Patent 2,426,044. Herein, tube 12 is provided with approximately 30 to 36 such grooves per inch of length of the tube, each of the grooves being approximately .003" to .009" deep. Herein grooves 20 may comprise annular grooves or may be arranged helically at small helix angles, as would result from an internal thread-cutting operation.

Inner wall surface 19 of tube 12 is further provided with at least one, herein three, helical groove 22 having a large helix angle and intersecting the capillary grooves 20 to deliver to the capillary grooves the weak liquid and to drain from the capillary grooves the rich liquid resulting from the contact of the rich gas therewith in the capillary grooves. As the tube 12 is inclined downwardly from end 13 to end 15, the helical groove 22 functions as a siphon causing the drained rich fluid to move toward end 15 of the tube for delivery to the absorber container 11. It is preferable that the cross section of helical grooves 22 be substantially larger than the cross section of the capillary grooves 20. Illustratively, the helical grooves 22 may be approximately .020" to .025" deep and approximately 1/16" wide. The helical grooves 22 may have a pitch of approximately six to nine inches.

In use, the weak liquid is delivered from the upper portion 14 of container 11 to flow along the bottom of the wall surface 19 toward conduit end 15. As the weak liquid flows therealong, the capillary grooves 20 draw portions thereof upwardly toward the top of the tube by capillary action, thereby causing substantially the entire internal surface 19 of the tube to be effective in presenting the weak liquid to the rich gas flowing upwardly therethrough from end 15 to end 13. Further, the intersecting of the capillary grooves 20 by the helical grooves 22 causes a discontinuous and mixed movement of the liquid in the capillary grooves further increasing the efficiency of transfer of the ammonia from the rich gas to the liquid. Still further, the helical grooves 22 combine with the rough surface characteristics of the fine capillary grooves 20 to cause a turbulence in the rich gas as it flows upwardly through the conduit increasing the efficiency of transfer of the ammonia to the liquid.

Facilitated, economical manufacture of tube 12 is provided by forming the tube from a flat sheet in which the grooves are provided prior to the arrangement thereof in the tubular configuration. Referring more specifically to FIG. 5, a first set of transverse grooves 23 are provided in one surface 24 of an elongate sheet 25, grooves 23 extending between sides 26 and 27 of sheet 25 and having a spacing and cross sectional configuration similar to that of capillary grooves 20. Sheet surface 24 is further provided with a plurality of grooves 28 extending at an angle between sides 26 and 27 and intersecting grooves 23, grooves 28 having a configuration corresponding to helical grooves 22. Upon completion of the provision of grooves 23 and 28 in sheet 25, the sheet is formed into a tubular configuration about axis 21 parallel to the direction of elongation of the sheet and with sides 26 and 27 of the sheet abutting. As indicated above, grooves 23 may be annular or helical. Thus, sides 26 and 27 may be indiscriminately positioned when abutted as it is not mandatory that the opposite ends of each groove 23 be aligned. Accurate alignment of the opposed portions of the helical grooves 22 similarly is not required, although when desired such alignment may be readily effected as a result of the larger size of the helical grooves.

The sides 26 and 27 of sheet 25 may be permanently joined as by welding 29 and, for optimum performance, the seam formed by welding 29 should be placed at the bottom of the completed absorber. The mid-portion of the formed tube may then be bent suitably to provide the turned portion 17 thereof and suitable heat transfer fins 30 secured exteriorly to the tube to complete the manufacture. A helicoid may or may not be positioned within the absorber, as shown and described in the Phillips application mentioned above.

Having described my invention as related to the embodiments shown in the accompanying drawing, it is my intention that the invention be not limited by any of the details of description, unless otherwise specified, but rather be construed broadly within its spirit and scope as set out in the accompanying claims.

The embodiments of the invention in which an exclusive property or privilege is claimed are defined as follows:

1. A conduit for use in a refrigeration system, comprising: a tube having an inner wall surface provided with first, capillary groove means extending substantially transversely to the axis of the tube over a major area of said wall surface, and a second, helical groove concentric of the tube axis and intersecting said capillary groove means, said second groove having a cross section substantially larger than that of the capillary groove means, said capillary groove means being helical and of substantially smaller pitch than said second groove.

2. A conduit for use in a refrigeration system, comprising: a tube having an inner wall surface provided with first, capillary groove means extending substantially transversely to the axis of the tube over a major area of said wall surface, and a second, helical groove concentric of the tube axis and intersecting said capillary groove means, said second groove having a cross section substantially larger than that of the capillary groove means, said capillary groove means comprising a plurality of capillary grooves extending substantially transversely to the axis of the tube, and said capillary grooves being helical and comprising helical groove segments joined end to end at points spaced longitudinally along a line defined by the intersection of said tube surface with a plane in which said axis lies.

3. A conduit for use in a refrigeration system, comprising: a tube having an inner wall surface provided with first, capillary groove means extending substantially transversely to the axis of the tube over a major area of said wall surface, and a second, helical groove concentric of the tube axis and intersecting said capillary groove means, said second groove having a cross section substantially larger than that of the capillary groove means, said capillary groove means comprising a plurality of capillary grooves extending substantially transversely to the axis of the tube, and said capillary grooves being helical and comprising single turn grooves terminating at a line defined by the intersection of said tube surface with a plane in which said axis lies.

4. A conduit for use in an absorber assembly of an absorption refrigeration system, comprising: a tube having an inner wall surface provided with a plurality of first, capillary grooves extending substantially transversely to the axis of the tube over a major area of said wall surface, there being approximately thirty to thirty-six such capillary grooves per inch and each groove being approximately .003" to .006" deep, said wall surface being further provided with a plurality of second, helical grooves concentric of the tube axis and intersecting said capillary grooves to deliver to and drain from said capillary grooves the liquid being siphoned and to cause said drained fluid to move toward one end of said second grooves, said helical grooves having a pitch of approximately 6" to 9", a depth of approximately .020" to .025" and a width of approximately 1/16".

References Cited in the file of this patent

UNITED STATES PATENTS

| | | |
|---|---|---|
| 1,711,553 | Von Platen | May 7, 1929 |
| 1,723,453 | Von Platen | Aug. 6, 1929 |
| 2,281,207 | Schoen | Apr. 28, 1942 |
| 2,350,347 | Gaugler | June 6, 1944 |
| 2,426,044 | O'Brien | Aug. 19, 1947 |
| 2,463,997 | Rodgers | Mar. 8, 1949 |
| 2,553,141 | Maynard | May 15, 1951 |
| 2,662,553 | Dimmock | Dec. 15, 1953 |
| 2,691,281 | Phillips | Oct. 12, 1954 |
| 2,779,222 | Edwards | Jan. 29, 1957 |